United States Patent [19]

Bishop et al.

[11] Patent Number: 4,602,521
[45] Date of Patent: Jul. 29, 1986

[54] RACK AND PINION STEERING GEAR

[75] Inventors: Arthur E. Bishop, P.O. Box 936, Crows Nest, New South Wales; Klaus J. Roeske, Beverly Hills, both of Australia

[73] Assignee: Arthur Ernest Bishop, New South Wales, Australia

[21] Appl. No.: 769,790

[22] Filed: Aug. 26, 1985

Related U.S. Application Data

[63] Continuation of Ser. No. 333,421, Dec. 22, 1981, abandoned.

[51] Int. Cl.$^4$ .............................................. B62D 1/20
[52] U.S. Cl. .................................... 74/498; 74/89.17; 74/422; 74/458
[58] Field of Search ....................... 74/422, 424.6, 458, 74/498, 89.17, 457, 424.5

[56] References Cited

U.S. PATENT DOCUMENTS

| | | | |
|---|---|---|---|
| 3,504,565 | 4/1970 | Lichtenauer et al. | 74/458 |
| 4,016,774 | 4/1977 | Baker et al. | 74/498 |
| 4,189,955 | 2/1980 | Bishop | 74/498 |
| 4,263,817 | 4/1981 | Taig | 74/422 |
| 4,382,389 | 5/1983 | Namiki et al. | 74/422 |
| 4,401,180 | 8/1983 | Nishikawa et al. | 74/498 |

FOREIGN PATENT DOCUMENTS

| | | | |
|---|---|---|---|
| 462162 | 1/1973 | Australia . | |
| 51161 | 4/1980 | Japan | 74/422 |

Primary Examiner—Kenneth J. Dorner
Assistant Examiner—Shirish Desai
Attorney, Agent, or Firm—Hill, Van Santen, Steadman & Simpson

[57] ABSTRACT

A rack and pinion steering gear of the kind in which a helical pinion engages a rack mounted in bearings, the rack being supported opposite the pinion by a spring loaded half round support journal, the spring acting to hold the pinion in contact with the teeth of the rack which are formed in such a manner as to provide in about the center of the rack a "ramp" in which there are tooth gaps of varying height providing a variation of slack free mesh center distance between the pinion and the rack, the maximum mesh center distance occurring in the mid travel portion of the rack and lesser mesh center distances occurring in positions of travel of the rack either side of the travel position of the present invention being characterized by the fact that the tooth gaps concerned are formed in such a manner as to form a ramp extending across the rack at an angle substantially the same as the angle made by the pinion axis with the rack axis whereby the possibility of an uneven distribution of the load between the teeth of the pinion and the teeth of the rack is reduced.

3 Claims, 13 Drawing Figures

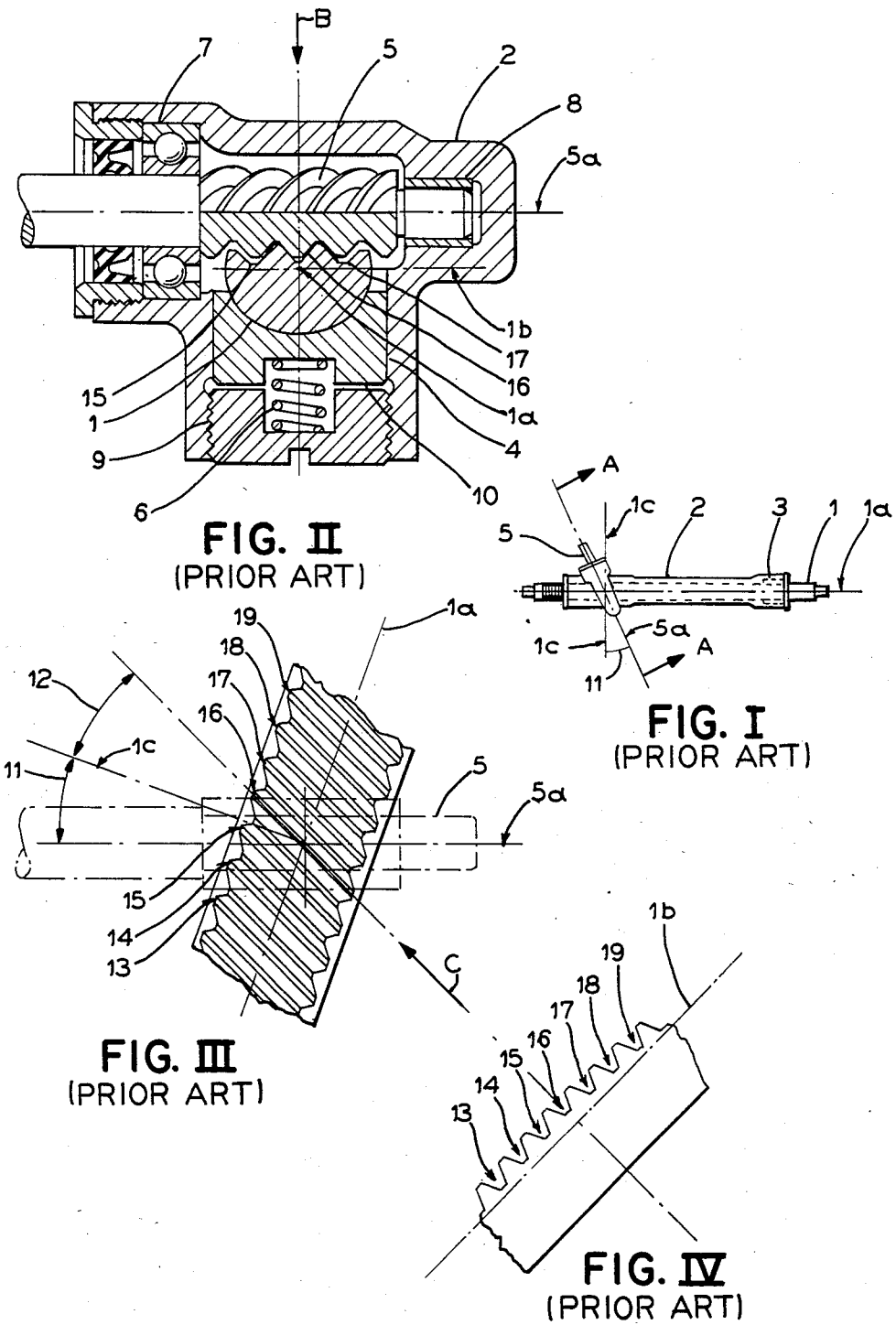

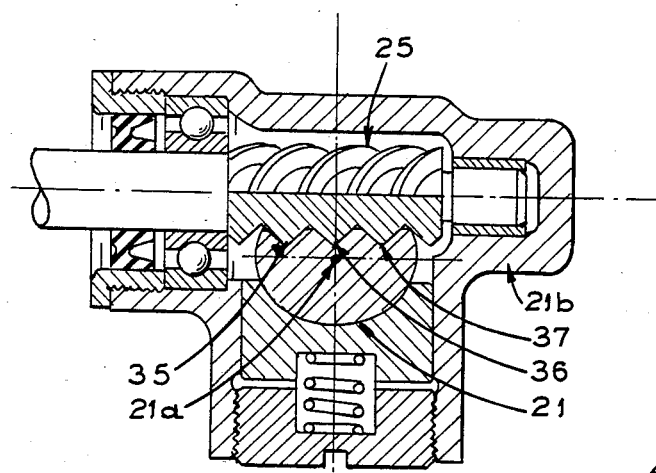
FIG. V
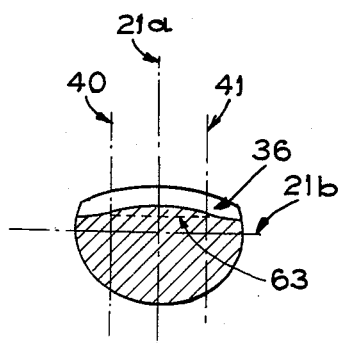
FIG. VII
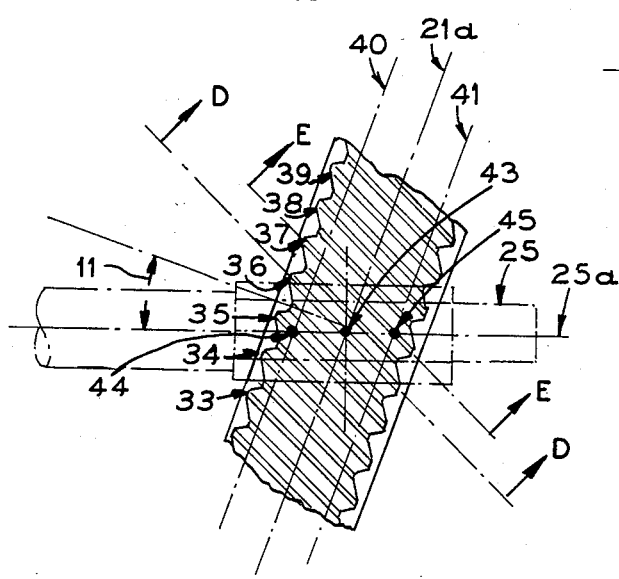
FIG. VI
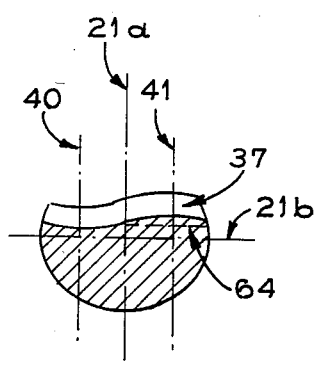
FIG. VIII

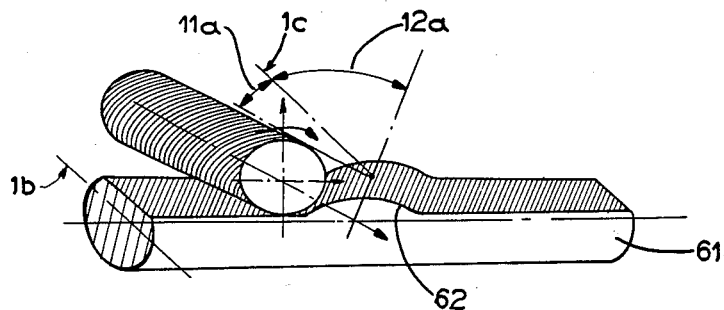
FIG. IX
(PRIOR ART)
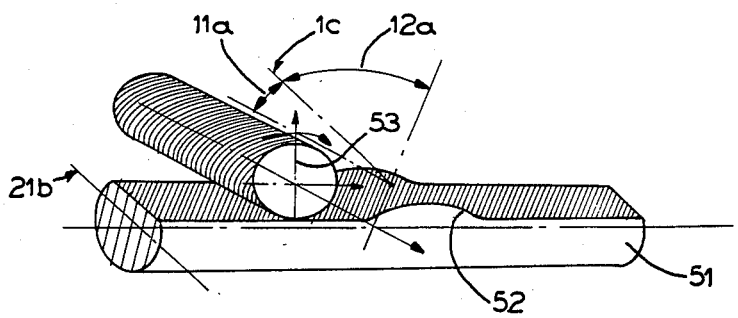
FIG. X
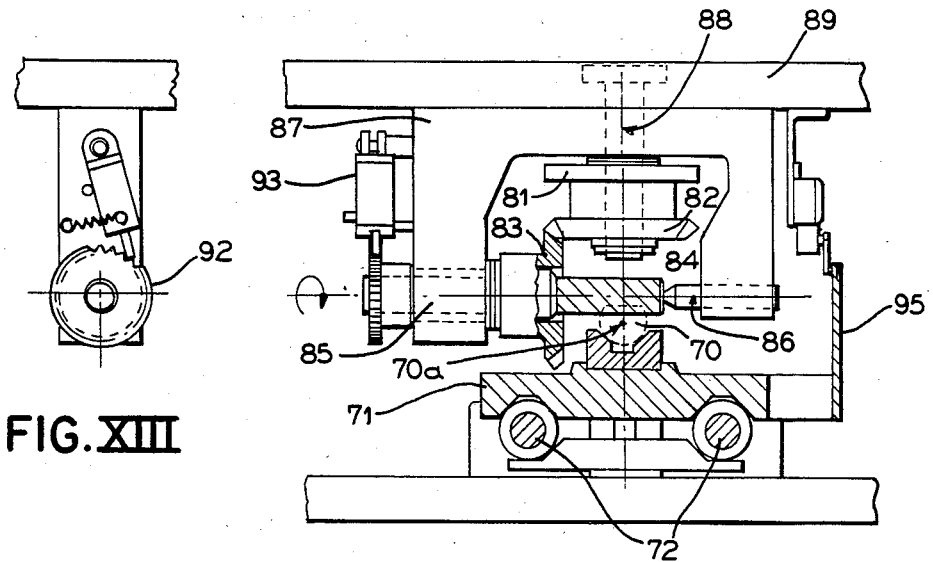
FIG. XIII
FIG. XII

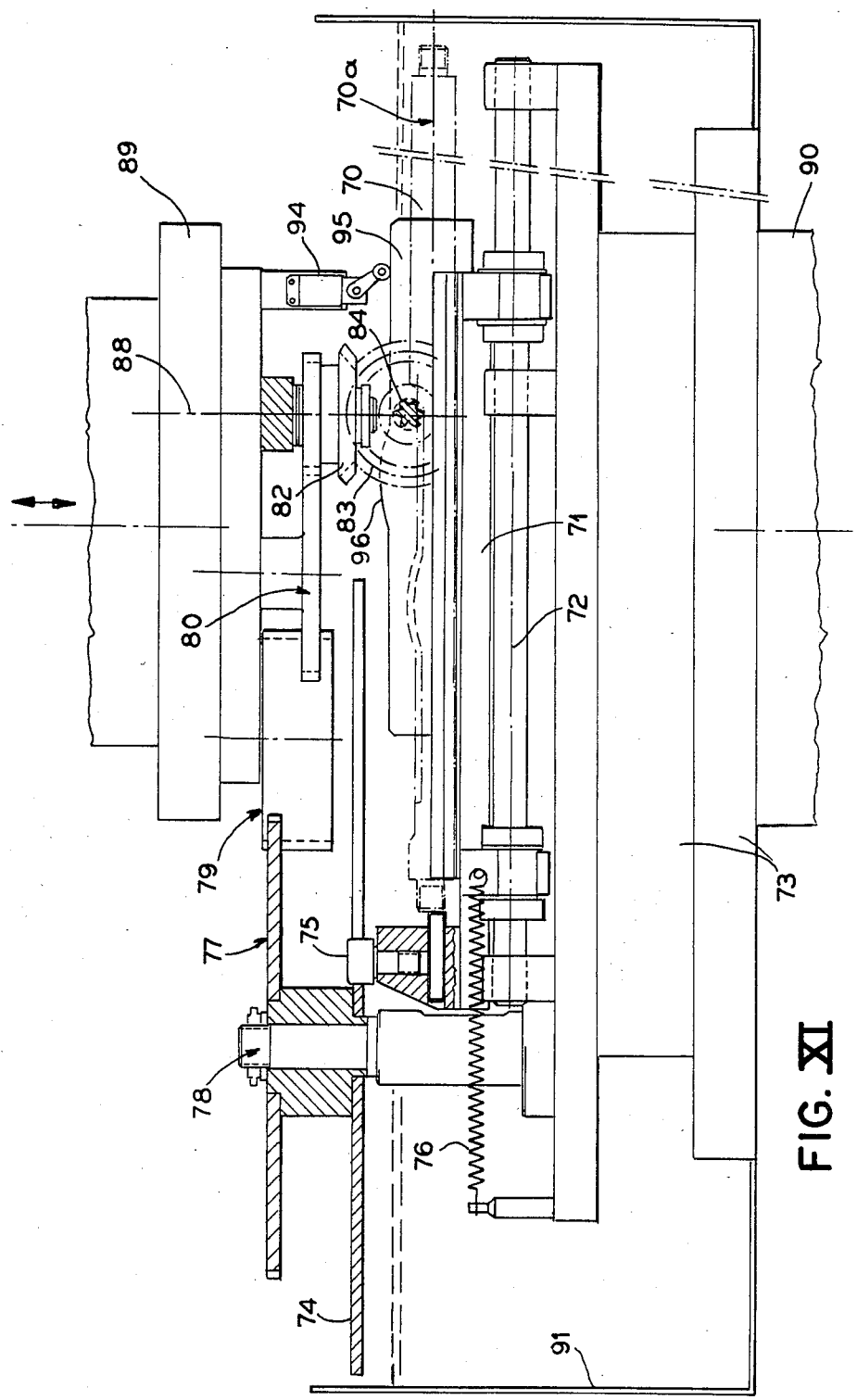

RACK AND PINION STEERING GEAR

This is a continuation of application Ser. No. 333,421, filed Dec. 22, 1981, now abandoned.

Rack and pinion steering gears have been used for many years in automobiles, both power assisted and manual types, and are now gaining in favour.

The simplest arrangement comprises a housing, a round bar rack having teeth cut adjacent to one end and a helical pinion, mounted in bearings, engaging these teeth. The rack, at the end remote from the pinion, slides in a journal provided in the housing and, at the pinion end thereof, a half round support journal is provided engaging the rack bar on the side opposite the teeth. This support journal is spring loaded against the rack bar to keep the rack generally in slack-free mesh with the pinion. At high loads, however, due to the inclination of the flanks of the teeth, the rack tends to move away from the pinion, overcoming the spring load and hence an adjustable positive stop is provided limiting the distance that the support journal (and hence the rack) can move away from the pinion to about 0.08 m/m. For the purpose of this description, the distance between the axis of the pinion and the plane parallel to the teeth of the rack passing through its axis, when the spring load is not overcome, is referred to as the slack-free mesh centre distance. The above plane in the rack will be referred to as the lateral plane.

Such moving-away of the rack under load, with resulting slack between rack and pinion teeth, can, under certain circumstances, result in an objectionable vibration termed "rattle". Generally this will not occur when the steering gear is loaded in one direction, as when the automobile is cornering, but rather when running straight ahead and the steering gear is loaded in first one direction and then the other. The situation is worst when running straight ahead on a rutted road.

The adjustable positive stop must therefore be particularly effective in the straight-ahead position, and may allow greater moving-away of the rack under load at other positions without risk of rack rattle.

However the centre tooth gap or gaps of the rack is or are most prone to wear, and adjustment of the positive stop will generally be required from time to time in order to avoid rack "rattle". If, after such wear, other tooth gaps of the rack are higher than the centre tooth gap, then the steering gear may jamb after such adjustment.

For this reason, according to accepted practice, the centre tooth gap or gaps of the rack is (or are) made higher than others along the length of the rack by an amount which allows for such wear, typically 0.1 to 0.15 m/m. This provision must also take into account variation of the slack-free mesh centre distance due to manufacturing errors in the teeth of both rack and pinion.

The term "height" in relation to tooth gap is here used as a convenient abbreviation to describe the combined effect of those parts of the flanks of adjacent teeth of the rack that control the slack-free mesh centre distance of the pinion when the pinion is engaged at any position of meshing with the tooth gap defined by those flanks. Tooth gaps having a greater height at any position along the gap will result in a greater slack-free mesh centre distance of the pinion at that position. As will become apparent the "height" of the tooth gap may vary along its length.

The generally used practice in manufacturing racks is broaching, and the desired variation of tooth gap height along the rack is provided for by having the various blades of the broach, each of which cuts one tooth gap, arranged at varying heights with respect to the rack lateral plane, the lowest blade, or blades, being on-centre. The variation of height of the blades will generally occur in two zones, one on each side of a small centre region of the rack, with most of the blades being at the greater height.

As mentioned earlier, a helical pinion is most commonly employed, and hence the teeth of the rack generally lie at a different angle (often as much as 45°) to the rack axis than does the pinion. It follows that where broaching is used to manufacture racks and variation of rack tooth gap height is provided by the method described above, the pinion will, at some points of rack travel, be meshing simultaneously with both high and low parts of tooth gaps of the rack. As will be shown later, such meshing will result in the load between teeth of the pinion and rack being unevenly distributed, leading to undesirably high stresses in some areas of mesh. It may also result in rough meshing between the teeth of the pinion and rack, such roughness being disconcerting to the driver and impairing the transmission of road feel. According to present practice the teeth of such gears can be made large enough to withstand such uneven meshing. However, where it is desired to reduce steering efforts through the use of a small pinion, the teeth of both rack and pinion tend to be small and weak, and such uneven distribution of load is undesirable.

It is a prime object of this invention to provide variation of slack-free mesh-centre-distance between rack and pinion without loss of the uniform distribution of tooth to tooth loads in those zones along the length of the rack where the such mesh centre distance is varying. According to the present invention the height of any one rack tooth gap in such transitional zones will be of varying height along its length, a property which cannot be provided by the process of broaching as employed hitherto.

A second object of the invention is to provide a practical method of manufacturing steering racks, having a variation of mesh centre distance with a pinion without impairing the smoothness of action or the uniform distribution of tooth loads.

The present invention consists in a rack and pinion steering gear employing a helical pinion journalled in a housing, a rack having a toothed end and a plain end, axially slideable in said housing in two bearings, one bearing at one end of the housing journalling the plain end of the rack and the bearing at the other end of the housing comprising a spring loaded pad on the side of the rack opposite the teeth and positoned opposite the pinion, the rack having at least two zones along its axis, one on each side of the centre of the toothed end of the rack, of teeth having tooth gaps of varying height as hereinbefore defined, providing a variation of slack-free mesh centre distance between the pinion and the rack, the maximum mesh centre distance occurring in the mid-travel position of the rack and lesser mesh centre distance occurring at positions of travel of the rack either side of the mid-travel position, the tooth gaps in either said zone being of varying "heights" along their lengths and the heights of all those parts of said tooth gaps that engage the pinion in any position of travel of the rack in either said zone being equal.

The invention further consists in a rack and pinion steering gear employing a helical pinion journalled in a housing, a rack having a toothed end and a plain end, axially slideable in said housing in two bearings, one bearing at one end of the housing journalling the plain end of the rack and the bearing at the other end of the housing comprising a spring loaded pad on the side of the rack opposite the teeth and positoned opposite the pinion, the rack having at least two zones along its axis, one on each side of the centre of the toothed end of the rack, of teeth having tooth gaps of varying height as hereinbefore defined, providing a variation of slack-free mesh centre distance between the pinion and the rack, the maximum mesh centre distance occurring in the mid-travel position of the rack and lesser mesh centre distance occurring at positions of travel of the rack either side of the mid-travel position the tooth gaps in either said zone being of varying heights along their lengths and variations of the heights of the said rack tooth gaps occuring across the rack at an angle to the axis thereof substantially the same as the angle made by the pinion axis with the axis of the rack to form a "ramp" extending across the rack at that angle.

The invention still further consists in an apparatus for making a master rack with which to make forging dies to form a rack as defined in the last two preceding paragraphs consisting of an EDM machine having upper and lower platens and means to raise and lower the upper platen, rack blank supporting means capable of longitudinal movement in the direction of the rack blank axis arranged on the lower platen, an electrode in the form of a facsimile of a helical pinion rotably mounted in a bracket attached to said upper platen, means for rotating said electrode intermittently, means to effect axial movement of the rack blank past the electrode in accordance with the rotational movement of the electrode, further cam means defining the position of the electrode in relation to the axis of the rack blank, cam follower means attached to said bracket making contact with said further cam means electric power supply means connected to the electrode and the rack blank.

The dimensional differences between a rack as conventionally manufactured and one made according to this invention may be small but are nevertheless, critical to its smooth and safe performance. This is particularly true of steering racks for manual steering gear where, in order to achieve low steering efforts, a very small diameter and high helix angle pinion is used, and hence small teeth. In such designs several teeth, of both rack and pinion may have to share the load at any one instant, and the height of such load-sharing teeth must match within a few thousandths of a m/m.

FIG. I shows a plan view of a rack and pinion steering gear with the tie rods and connection to the steering wheel omitted.

FIG. II is a section on line AA of FIG. I for a conventionally made steering gear.

FIG. III is a plan view of a portion of the rack as indicated by direction B of FIG. II, and the pinion being shown ghosted.

FIG. IV is a side view of the rack shown in FIG. III in direction C.

FIG. V is a view corresponding to FIG. II of a rack and pinion made according to the invention.

FIG. VI is similarly a view corresponding to FIG. III.

FIG. VII is a section of the rack along lines DD of FIG. VI.

FIG. VIII is a section of the rack along lines EE of FIG. VI.

FIGS. IX and X are isometric drawings illustrating certain features of difference between conventional practice and the present invention.

FIGS. XI, XII and XIII are views of an apparatus for forming a master rack for use in making a rack for a rack and pinion steering gear according to the invention.

Referring now to the drawings:

In FIGS. I and II rack 1 having an axis 1a slides in housing 2 carried in bearing 3 at one end of the housing. At the other end the rack is supported in support pad 4 (see FIG. II) and forced into mesh with pinion 5 by spring 6.

The pinion 5 is journalled in housing 2 by bearings 7 and 8 and rotates about axis 5a. Pad 4 is limited in its movement by adjusting screw 9 so that clearance 10 between the pad and screw is typically 0.08 m/m in the centre position.

In FIG. II the rack has been sectioned in its mid-travel position as when the car is moving straight ahead. The pinion 5 is also part-sectioned in the plane of the pinion axis to show the typical engagement of the teeth of the rack and pinion. The lateral plane of the rack is indicated by chain-dotted line 1b.

Pinion 5 typically has a steep helix angle resulting from the combined effect of its being installed at some angle 11 to the normal to the rack axis 1c (FIGS. I and III) and of the inclination of the rack teeth to the normal to the rack axis at an angle 12 (FIG. III). As referred to earlier the rack is made with tooth gaps of varying height with respect to plane 1b (FIG. IV), with centre tooth gap 16 being the highest. Adjacent tooth gaps to the left and right of gap 16, being 15, 14 and 13, and 17, 18 and 19, respectively are lower than tooth gap 16 for the reasons stated earlier.

The difference of height between tooth gaps 13 and 16 and 19 and 16 is here shown exaggerated and may occur suddenly in the manner of a step or be distributed over several teeth so as to comprise a progressive ramp. Similarly there may be more than one tooth gap at maximum height rather than one only, as shown here. The purpose of illustrating the teeth thus is to exaggerate the effect on the meshing of pinion and rack teeth in the zone where the step or ramp in rack tooth height occurs.

As before mentioned, the teeth of such racks are, in accordance with accepted practice, made by broaching with each tooth being formed by a separate set of teeth in the broach. Hence any one tooth gap cannot vary in height along its length.

The result is shown in FIG. II, where it can be seen that, in the centre position of the rack, the three teeth of the pinion, all of equal height, engage simultaneously tooth gaps 15, 16 and 17 of the rack of differing heights relative to plane 1b. Notwithstanding that rack tooth gap 16 is tightly engaged in the corresponding tooth of pinion 5, under the action of spring 6, rack tooth gaps 15 and 17 will engage the corresponding pinion teeth with slack. As before mentioned, the term "height" in respect of rack tooth gaps refers to the relationship between the working flanks and the lateral plane and not the tops or roots of the teeth.

High loads applied to the rack by the suspension will be poorly distributed in a manner which may lead to failure of the teeth. Moreover, under the action of the steep helix of the pinion, the rack may, when subjected to reversing direction of axial load along its axis 1a, due to road irregularities, roll from side to side alternately taking up the slack at tooth gaps 15 and 17 of FIG. II. This will result in rack "rattle" in the straight-ahead position, where the symmetry of load pattern is most likely to promote this phenomenon. If, on the other hand, several central tooth gaps of the rack are made high, then the intensely localised wear which occurs on the centre tooth gap may result, on adjustment, in binding of the unworn, high tooth gaps adjacent to the centre tooth gap.

Now referring to FIGS. V, VI and VII which show a rack made according to the invention. Rack tooth gaps 35, 36, and 37 will be seen in FIG. V to engage the corresponding teeth of pinion 25, equally and without slack. This will occur not only at the centre position of travel of the rack shown here, but also at all positions of travel of the rack, including those where the mesh centre distance is changing.

To accomplish this, the height of rack tooth gaps 35 and 37, where they cross pinion axis 25a, as in planes 40 and 41, parallel to rack axis 21a, respectively, must be equal to the height of centre tooth gap 36.

On the other hand, the heights of tooth gaps 35 and 37, where they cross rack axis 21a must be substantially lower, as must also be the height of tooth gap 36, where it crosses planes 40 and 41. These results are shown for tooth gaps 36 and 37 in FIGS. VII and VIII, which are sections along lines DD and EE of FIG. VI respectively. A similar section for tooth 35 would be a mirror image, about the vertical axis, of FIG. VIII. It is evident that such sections cannot be broached.

Certain properties of racks made according to the invention may best be studied by isometric drawings FIGS. IX and X, in which only the rack and pinion are shown. Here the teeth of both rack and pinion are greatly reduced in size and the pinion is considered to roll and move in the manner indicated, relative to a fixed rack, by arrows. Angles 11 and 12 of FIG. II are here indicated by angles 11a and 12a relative to the normal to the rack axis 1c.

For the purpose of comparison, these angles are assumed to be the same in the case of racks made in accordance with conventional practice as shown in FIG. IX as in the case of racks made according to the invention as in FIG. X. It will be evident that as the pinion of FIG. IX encounters ramp 62 it will bear hard on the teeth on one side of the rack causing it to roll. However even such rolling will result only in a sharing of the load between teeth at opposite sides of the rack and not evenly across the width.

On the other hand the pinion of FIG. X will encounter hump 52 uniformly across its width at all times.

Furthermore, in the central position of travel of the pinion relative to the rack, the pinion of FIG. IX will promote rocking of the rack whereas that of FIG. X will not.

It is to be emphasised that these Figures are purely illustrative and are given only to assist an understanding of the invention. In practice in most cases the tips of all the teeth of a rack will lie in one plane, the "ramp" made apparent in FIGS. IX and X existing only in the configuration of the flanks of the tooth gaps affected.

The problems of machining racks having teeth of the complex geometry of FIG. X are obvious. Broaching cannot be used, (because individual teeth require profiles in section as shown in FIGS. VII and VIII). The shapes of the teeth in the ramp area 52 of FIG. X are derived from the pinion installation angle 11a and the diameter of the pinion (an infinitely large pinion would only engage the highest point of the rack).

From this it follows that the teeth of ramp 52 can only be generated without error by a former which is a facsimile of the pinion or a cutter having a tooth or teeth which is or are a facsimile of those of the pinion and either of which is caused to move relative to the lateral plane of the rack 21b in a manner which combines the four arrows of FIG. IX.

The problem is very similar to that found in the manufacture of variable ratio racks as described in Australian Patent No. 462,162. According to that patent the teeth of the rack vary in pitch along its length and have differing pressure angles and skew angles. As described in that patent there are zones each side of the centre portion of rack travel where the properties of the teeth are changing rapidly and generation of such teeth must be by a cutter or former which is a facsimile of the pinion and caused to move with respect to the rack axis similarly to the real pinion.

In a machine capable of generating racks based on the use of such a cutter, the cutter should be caused to move in the desired meshing relationship to provide teeth in the rack having a variable ratio, and provision should also be made for the cutter to move away from and towards the rack lateral plane 21b, e.g. as indicated by arrow 53, so generating the ramp 52.

An alternative method which has been successfully used to generate variable ratio racks employs an electrode which is a facsimile of the pinion and has imparted to it in an electro discharge machining (EDM) machine the motions outlined above, as it engages and erodes the rack.

A suitable apparatus for this purpose is illustrated in FIGS. XI, XII and XIII. Rack 70 having longitudinal axis 70a is supported on slideway 71 which moves on ways 72 of base 73. This movement is controlled by scroll cam 74 which acts upon roller 75 carried on slideway 71. Spring 76 serves to keep roller 75 pressed against cam 74 at all times.

Cam 74 is secured to gear 77 and these jointly rotate on spindle 78 secured to the base. Gear 77 is driven by idlers 79, 80 by gear 81, itself driven by bevel gears 82 and 83. Electrode 84 is secured to spindle 85 at the one end and centre 86 at the other, both of which are carried by frame 87, This frame is pivotally mounted about vertical axis 88 to the upper platen 89 of an EDM machine. This upper platen moves up and down as shown by the arrows in the well known manner of this equipment.

Base 73 is secured to the lower platen 90 of the machine, which is provided with dielectric tank 91. It will be seen that all the gears except 77 move up and down with movement of platen 89. Idler 79 is made wide to permit such movement without disengaging with gear 77. Spindle 85, and hence electrode 84, is caused to rotate in small increments by ratchet wheel 92 and solenoid 93. Incremental rotation of the electrode 84 is transmitted by the gears to cam 74 and so causes incremental travel of slideway 71 and hence rack 70.

Cam 74 will be a uniform scroll in the case of racks having a uniform ratio or non-uniform scroll where variable pitch is required.

Note that the angle between the axis of spindle 85 and axis 70a of the rack, here shown as a right angle, can be made to correspond with angle 11 of FIG. VI.

In an EDM machine as used conventionally the upper platen carries an electrode which moves downwards to engage the workpiece secured to the lower platen. The electrode and the workpiece are connected to the terminals of an electric power supply which causes sparking to occur between them, eroding the workpiece. Short-circuiting is avoided by causing the upper platen to move instantly upwards a small amount when this is imminent, and so maintaining a nearly constant spark gap clearance. A microswitch attached to the top platen is set to retract the electrode clear of the workpiece when the desired depth is reached.

When using the apparatus described above, the usual microswitch is replaced by switch 94 which has a follower which contacts cam 95 secured to slideway 71. On switch 94 closing, a current is passed through solenoid 93 so incrementing rotation of the electrode 84 and travel of the rack 70.

The resulting reduction of the spark gap causes the machine to raise platen 89 slightly and the erosion of the next part of the rack to proceed.

Thus, cam 95 acts as a downfeed stop for the electrode. Now, if cam 95 is provided with a hump or rise as at 96 it follows that a corresponding hump or rise will be produced in the rack being eroded. All features of this hump will be orientated with respect to the rack in the identical manner in which the pinion is orientated.

Neither of the forgoing two processes are entirely suited to high volume production and, hence, either process may be used to make a master rack from which can be made a forming die.

Instead of having the cutter or electrode move away from and towards the rack lateral plane in the manner just described, the cutter may be of a modified form and set to move in a manner relative to the rack or of a shape which generates the centre tooth gap narrower and the side tooth gaps wider so providing the desired change of slack-free meshing centre distance and in the desired pinion-oriented fashion. Such a method is not preferred as it would result in the roots of the teeth remaining at constant height as shown in dotted lines 63 and 64 of FIGS. VII and VIII. From considerations of tooth strength, it is desirable that the roots of the teeth have the same change of height in respect of the rack lateral plane as does the whole tooth form. On the other hand, the tops of the teeth may be made parallel to the rack lateral plane without disadvantage.

We claim:

1. A rack and pinion steering gear employing a housing, a helical pinion journalled in the housing, a rack having a toothed end and a plain end, the toothed end of said rack comprising spaced teeth extending transversely of the rack and at an angle to the axis of the pinion, each tooth having a top separating tooth flanks and having a root between successive facing teeth flanks, and a tooth gap formed by the facing flanks of successive teeth, the height of tooth gap at any given point along the length of the tooth gap comprising the height of the midpoint of the line of pinion contact with said flanks at said given point, said rack being axially slideable in said housing in two bearings to travel along its longitudinal axis transverse to the axis of the pinion, one bearing at one end of the housing journalling the plain end of the rack and a second bearing at the other end of the housing comprising a spring loaded pad on the side of the rack opposite the rack teeth and positioned opposite the pinion, the toothed end of the rack having an on center mid-travel portion at the position of mid-travel of the rack and at least two zones along its longitudinal axis, one on each side of the on center portion, the toothed end of the rack having tooth gaps of varying height along the lengths of the teeth providing a variation of slack-free mesh center distance between the pinion and the rack, the maximum mesh center distance occurring in the mid-travel on center position of the rack and lesser mesh center distances occurring at positions of travel of the rack on either side of the mid-travel position, the tooth gaps in either said zone being of varying heights along their lengths and the heights of all of said tooth gaps engaging the pinion in any given position of travel of the rack in either of said zones being equal.

2. A rack and pinion steering gear employing a housing a, helical pinion journalled in the housing, a rack having a toothed end and a plain end, the toothed end of said rack comprising spaced teeth extending transversely of the rack and at an angle to the axis of the pinion, each tooth having a top separating tooth flanks, and having a root between successive facing teeth flanks and a tooth gap formed by the facing flanks of successive teeth, the height of tooth gap at any given point along the length of the tooth gap comprising the height of the mid point of the line of pinion contact with said flanks at said given point, said rack being axially slideable to travel along its longitudinal axis transverse to the axis of the pinion in said housing in two bearings, one bearing at one end of the housing journalling the plain end of the rack and a second bearing at the other end of the housing comprising a spring loaded pad on the side of the rack opposite the rack teeth and positioned opposite the pinion, the toothed end of the rack having at least two zones along its longitudinal axis, one on each side of the on center portion of the toothed end of the rack having tooth gaps of varying height providing a variation of slack-free mesh center distance between the pinion and the rack, the maximum mesh center distance occurring in the mid-travel on-center position of the rack and lesser mesh center distances occurring at positions of travel of the rack either side of the mid-travel on-center position, the tooth gaps in either said zone being of varying the heights along the lengths of the rack teeth and variations of the heights of the said rack tooth gaps occurring across the rack at an angle to the longitudinal axis thereof substantially the same as the angle made by the pinion axis with the axis of the rack to form a "ramp" extending across the rack at that angle.

3. A rack and pinion steering gear as claimed in claim 1 or claim 2 wherein the distance between the roots of the teeth of the rack and the rack axis varies directly as the heights of the said tooth gaps.

* * * * *